Aug. 20, 1935.  J. B. WHITTED  2,011,837
SHOCK ABSORBER
Filed June 30, 1933
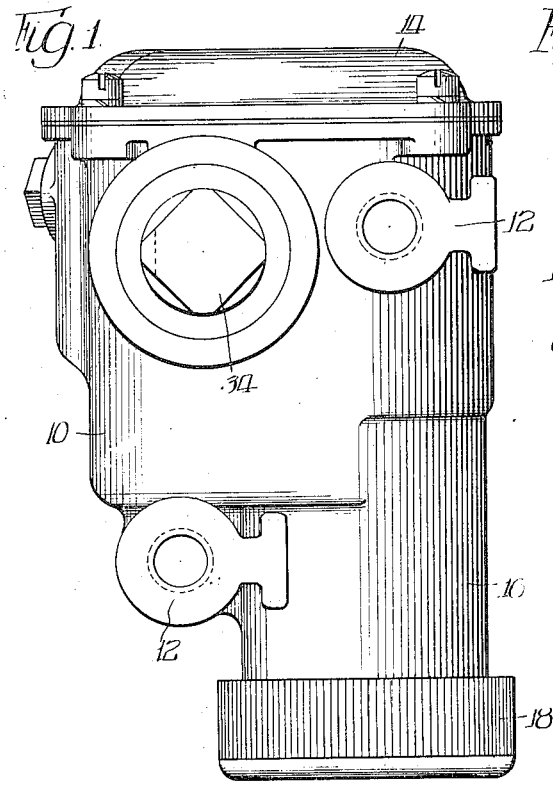
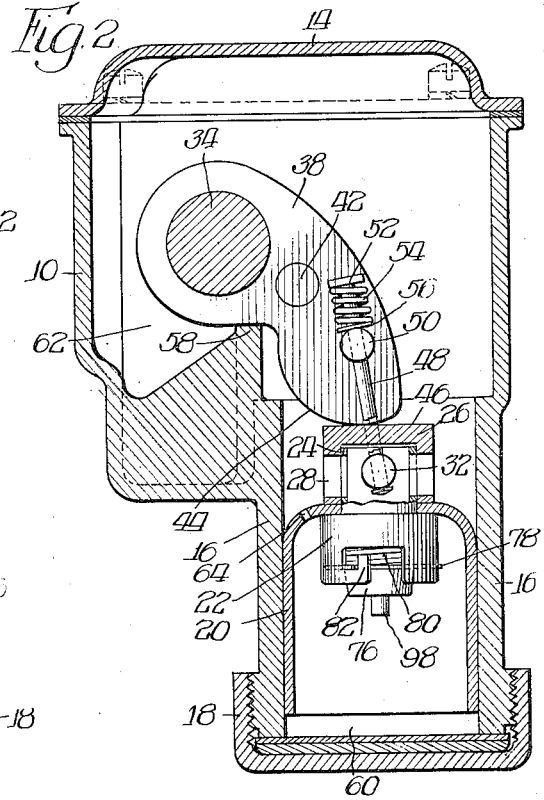
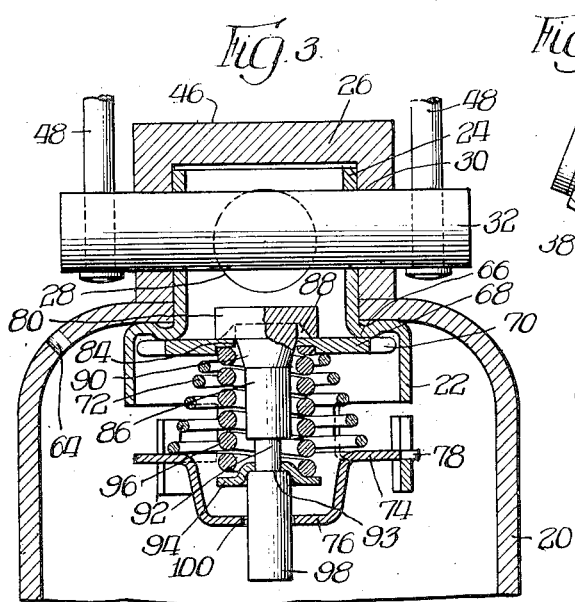
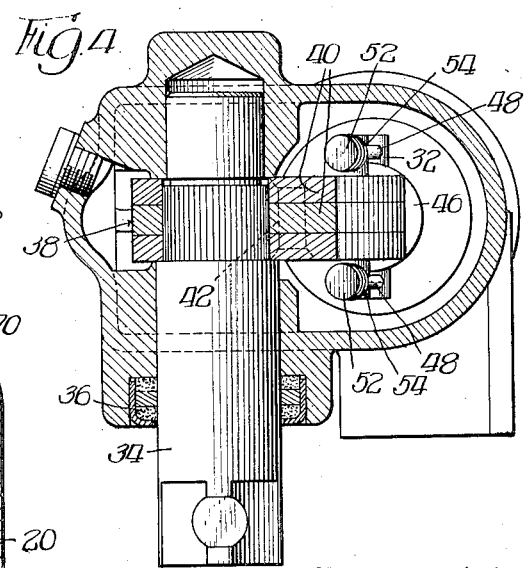
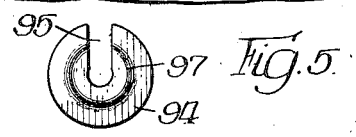
Inventor:
John B. Whitted,
By Wilkinson Huxley Byron & Knight
attys Patented Aug. 20, 1935

2,011,837

UNITED STATES PATENT OFFICE 2,011,837

SHOCK ABSORBER

John B. Whitted, Chicago, Ill., assignor, by mesne assignments, to Houde Engineering Corporation, Buffalo, N. Y., a corporation of New York Application June 30, 1933, Serial No. 678,375

13 Claims. (Cl. 188—88)

This invention relates to improvements in shock absorbers, particularly shock absorbers such as used on motor vehicles between the frame and the axles.

It is an object of the present invention to disclose an improved single acting shock absorber of simple and cheap construction in which an improved type of control valve is directly associated with the movable piston.

It is further an object of the present invention to provide a control valve construction which is cheap to manufacture and relatively easy to assemble.

Further improvements relate to the novel construction of the operating lever and the manner of resiliently connecting the lever to the piston.

Additional objects and advantages of my improvements will be more readily apparent from the following description taken in connection with the attached drawing, in which Figure 1 is a side elevation of the shock absorber;

Figure 2 is a vertical section;

Figure 3 is an enlarged detail vertical section of the control valve assembly;

Figure 4 is a horizontal section showing the rock shaft and lever, and

Figure 5 is a detail plan view of a spring seat member.

The shock absorber casing 10 is formed with lugs 12 through which the casing may be attached to the vehicle frame. The top of the casing is closed by a cap 14 and the bottom of the cylinder part 16 of the casing is closed by a cap 18. The cup-shaped piston 20 is mounted for slidable movement in the cylinder 16 with its open end facing downwardly. The member 22 constitutes a housing for the valve assembly and is provided with a tubular extension 24 protruding through the upper end of the piston 20 and is secured to a head 26. The portion 24 of the valve housing and the head 26 are formed with openings 28 to permit free flow of the fluid in the shock absorber, and additional openings 30 serve to admit a rotatable cross pin 32.

The upper part of the shock absorber casing is provided with a rock shaft 34. The outer end of the rock shaft 34 is sealed against the escape of fluid by the sealing unit 36. Within the casing 10 the shaft 34 has secured thereto a cam lever 38 built up of a plurality of sections 40 fastened together by rivet 42. The operating face 44 of the cam lever is ground to provide a smooth surface for contact with the flat upper face 46 of the piston head 26. The cam lever 38 and the piston are held in resilient contact by the provision of a pair of links 48 attached to the pin 32 and slidably extending through the ends of a pin 50 rotatably mounted in the cam lever 38. The heads 52 of the pins 48 serve as abutments for springs 54, which react through washers 56 upon the pin 50. The casing 10 may be internally formed with a rib 58 to constitute a stop for the cam lever 38.

In order to restrict and control the flow of fluid from the compression chamber 60 within and beneath the piston 20 and the reserve chamber 62 above the piston, I provide a novel construction of control valve. The piston may be formed with a small metering orifice 64 to take care of the flow due to slight shocks and small movements of the piston. Also, the orifice 64 will react as an air bleed to permit the escape of air from the top of the inside of the piston when the piston is operating either in horizontal or vertical position. The valve housing 22 is formed with a valve seat 66 for a disk valve 68 which has a notched edge 70. The valve 68 is lightly held upon its seat by a conical coil spring 72 which seats at its lower end upon a disk member 74, the central portion 76 of which is depressed for a purpose later to be described. The disk 74 is provided with fingers 78 adapted to engage bayonet joint connections formed in the housing 22. Thus in Figure 2 the housing 22 is shown to be cut out as at 80, leaving L-shaped fingers 82. The disk 74 is pressed upwards against the resistance of the spring 72 and then is rotated slightly to bring it to a position in which it may move downwardly to its seated position where it is held against rotation by the fingers 82.

The disk valve 68 is formed with a central aperture 84 which receives a valve stem 86. The valve head 80 of the stem partially sectioned in Figure 3 is formed with an undercut 88 which provides a clearance space to facilitate the flow of fluid after it has passed the aperture 84. The valve stem has a conical or tapered shank 90 which cooperates with the aperture 84 to provide an increasing area of opening for fluid flow as the valve stem is moved from its normal seated position. The stem 86 has a reduced portion 92 forming a shouldered seat 93 for a disk member 94 constituting a seat for the coil spring 96. As shown in detail in Figure 5, the disk 94 has a radial slot 95 to permit assembly of the disk with respect to the reduced portion 92 of the stem 86. Also, the disk 94 is dished, as at 97, to engage the shouldered seat 93 of the stem 86 so that the disk 94 is held in position by the spring pressure and cannot slip off. The valve stem is extended as at 98 through the opening 100 in disk 76 for guidance thereby.

Upon rebound of the wheels and leaf springs of the vehicle, the fluid under pressure in the compression chamber causes the inner valve, having a tapered shank, to open to a greater or lesser degree, thereby metering the flow from the compression chamber to the upper reserve chamber. Upon reverse movement the large disk valve 68 will open immediately under the influence of suction created by the upward movement of the piston, thereby quickly and positively filling the compression chamber with fluid. The inner coil spring 96 has considerably more tension than the conical spring 72 and the inner spring is calibrated to provide the desired amount of resistance against fluid pressure acting upon the inner valve. The spring and link connection between the piston and the operating cam lever holds the parts in contact to prevent lost motion and a noisy operation. The valve housing 22, together with the assembled valves, is secured to the piston 20 by the pin 32. Removal of the pin 32 will permit removal of the valve housing. Also it is possible to disassemble the valves without removing the valve housing from the piston. Thus by simple manipulation the disk 74 may be separated from the valve housing 22 and the valves together with the springs may be removed from the valve housing.

I claim:

1. In a shock absorber, a piston, a cylinder and a double acting control valve assembly removably mounted on said piston, said valve assembly comprising an apertured disc valve adapted to open in one direction and a solid valve stem having a conical or tapered portion extending into said disc valve apertures and adapted to open in the opposite direction.

2. In a shock absorber, a cylinder, a piston in said cylinder, a valve housing carried by said piston and forming a valve seat, a disc valve spring-pressed to seated position upon said seat, a solid valve stem having a conical or tapered portion extending through an aperture in said disc valve and spring-pressed to seated position therein, said valve being adapted to open in a direction opposite to said disc valve and providing an increasing area of opening through said aperture for fluid flow dependent upon the degree of opening movement.

3. A valve assembly for shock absorbers comprising a cup-shaped valve housing forming an interior valve seat, a disk valve adapted to cooperate with said seat, said disk valve having an apertured valve seat therein, a valve having a stem extending through the apertured valve seat in said disk valve, a pair of springs, a pair of spring seat members, one of which is removably attached to said valve housing and the other of which is attached to said valve stem, one of said springs being arranged to act between the spring seat member carried by said housing and the disk valve and the other spring being arranged to react between the disk valve and the spring seat member carried by said valve stem.

4. In a shock absorber, a movable piston, a cup-shaped housing carried by said piston and forming an interior valve seat, a disk valve seated within said housing and cooperating with said seat, a cap member removably coupled to said housing by a bayonet joint connection and a spring reacting between said cap member and said disk valve.

5. In a shock absorber, a movable piston, a cup-shaped housing carried by said piston and forming an interior valve seat, a disk valve seated within said housing and cooperating with said seat, a cap member removably coupled to said housing by a bayonet joint connection, a spring reacting between said cap member and said disk valve, said disk valve having a central aperture therein, a valve stem having a head seated upon one side of said disk valve and a tapered shank extending through the aperture in said disk valve and a spring stronger than said first-mentioned spring reacting between said disk valve and the valve stem.

6. In a shock absorber, a movable piston, a cup-shaped housing carried by said piston and forming an interior valve seat, a disk valve positioned within said housing and cooperating with said seat, a spring seat member removably carried by said valve housing, a spring reacting between said spring seat member and said disk valve, said disk valve having a central aperture therein, a second valve having a head adapted to seat upon said disk valve in a direction opposite to the seating of said disk valve upon said valve housing, said second valve having a stem extending through the aperture in said disk valve, a second spring seat member having a radial slot for removable attachment to said valve stem, a second spring reacting between said second spring seat member and said second disk valve.

7. In a shock absorber, a double acting valve assembly comprising a disk valve adapted to open in one direction, said disk valve having a central aperture, a second valve carried by said disk valve and adapted to open in the opposite direction, said second valve comprising a valve head and a valve stem adapted to extend through the aperture in said disk valve, said valve head having an annular recess cut therein immediately adjacent the aperture in said disk valve whereby said head seats upon said disk valve by a narrow annular portion of said valve head concentric with but spaced from the aperture in said disk valve.

8. In a hydraulic shock absorber, a cylinder, a piston movable therein, an oscillatable shaft having a lever extending therefrom into engagement with said piston to shift it in one direction in said cylinder, a pin extending through said piston, yieldable linkage between said pin and said lever for moving said piston in the opposite direction with said lever, a valve housing within said piston secured thereto by said pin, and valve mechanism within said valve housing for controlling the flow of fluid from one side of the piston to the other during reciprocation thereof.

9. In a hydraulic shock absorber, a cylinder containing hydraulic fluid, a piston movable in said cylinder, an oscillatable shaft having a lever extending therefrom into engagement with said piston to push said piston in one direction, yieldable linkage between said piston and said lever for pulling said piston in the opposite direction, a valve housing within said piston, a common means for securing said valve housing and said linkage to said piston, and valve mechanism within said valve housing for controlling the fluid flow from one side of the piston to the other.

10. In a hydraulic shock absorber, a cylinder for containing hydraulic fluid, a cup shaped piston having an opening in its face and a cup shaped head registering with said opening, a valve housing in the form of a cylindrical shell having a body portion abutting against the inner side of the piston base and having a neck portion extending through the piston opening and into said head, a pin extending through said head and said valve housing neck to secure said piston and said head and said housing rigidly together, means for reciprocating said piston in said cylinder to displace the fluid therein, and valve mechanism within said valve housing for controlling the displaced fluid flow.

11. In a hydraulic shock absorber, a cylinder for containing hydraulic fluid, a cup shaped piston within said cylinder having a hollow head thereon, a valve housing having a body portion within said piston and a neck extending into said piston head, a pin extending through said piston head and valve housing neck portion securing said valve housing to the piston, means for moving said piston in said cylinder to displace the hydraulic fluid therein, and valve mechanism within said valve housing for controlling the fluid flow.

12. In a hydraulic shock absorber, a cylinder for containing hydraulic fluid, a piston structure comprising a hollow body and a hollow head thereon, a valve housing within the piston body and having a neck portion extending into the piston head, a pin extending through the piston head and a valve housing neck whereby said housing and piston structure are detachably secured together, an actuator for pushing said piston in one direction in said cylinder, a linkage between said pin and said actuator whereby said piston structure is pulled in the opposite direction by said actuator, and valve mechanism within said valve housing for controlling the flow of the displaced hydraulic fluid.

13. In a hydraulic shock absorber, a cylinder for containing hydraulic fluid, a piston structure comprising a hollow body and a hollow head thereon, a valve housing in the form of a cylindrical sheet metal shell within said piston and having a neck extending into the piston head, a pin extending through said head and neck to detachably secure the valve housing and piston together, a detachable bottom for said valve housing, valve mechanism retained by said bottom within the valve housing for controlling the flow of the fluid displaced in said cylinder by said piston.

JOHN B. WHITTED.